United States Patent [19]

Valentine et al.

[11] Patent Number: 5,300,932
[45] Date of Patent: * Apr. 5, 1994

[54] MOTOR VEHICLE POLICE RADAR DETECTOR FOR DETECTING MULTIPLE RADAR SOURCES

[75] Inventors: Michael D. Valentine; Stephen R. Scholl; Clarence R. Groth, all of Cincinnati, Ohio

[73] Assignee: Valentine Research, Inc., Cincinnati, Ohio

[*] Notice: The portion of the term of this patent subsequent to Apr. 27, 2010 has been disclaimed.

[21] Appl. No.: 94,759

[22] Filed: Jul. 20, 1993

Related U.S. Application Data

[60] Continuation of Ser. No. 982,594, Nov. 27, 1992, Pat. No. 5,250,951, which is a division of Ser. No. 891,715, Jun. 1, 1992, Pat. No. 5,206,651, which is a division of Ser. No. 687,282, Apr. 18, 1991, Pat. No. 5,146,226.

[51] Int. Cl.$^5$ .................................................. G01S 7/40
[52] U.S. Cl. ..................................................... 342/20
[58] Field of Search ......................................... 342/20

[56] References Cited

U.S. PATENT DOCUMENTS

| | | |
|---|---|---|
| 3,115,622 | 12/1963 | Jaffe . |
| 4,315,261 | 2/1982 | Mosher . |
| 4,613,989 | 9/1986 | Fende et al. . |
| 4,622,553 | 11/1986 | Baba et al. . |
| 4,626,857 | 12/1986 | Imazeki . |
| 4,630,054 | 12/1986 | Martinson . |
| 4,631,542 | 12/1986 | Grimsley . |
| 4,668,952 | 5/1987 | Imazeki et al. . |
| 4,686,499 | 8/1987 | Furnish . |
| 4,692,763 | 9/1987 | Gregg, Jr. . |
| 4,698,632 | 10/1987 | Baba et al. . |
| 4,725,840 | 2/1988 | Onazietti . |
| 4,750,215 | 6/1988 | Biggs . |
| 4,841,302 | 6/1989 | Henry . |
| 4,949,088 | 8/1990 | Ryan et al. . |
| 4,954,828 | 9/1990 | Orr . |
| 4,965,732 | 10/1990 | Roy, III et al. . |
| 5,001,777 | 3/1991 | Liautaud . |
| 5,164,729 | 11/1992 | Decker et al. . |
| 5,206,651 | 4/1993 | Valentine et al. ............... 342/20 |

OTHER PUBLICATIONS

Microwave Passive Direction Funding by Stephen E. Lipolay, Published by John Wiley & Sons 1987.
New Snooper System Makes All Other Radar Detectors Obsolete–advertisement by Snooper Direct in Jun. 1988 Car & Driver.
Can You See the World's Most Expensive Radar Detection System?–Advertisement by Sonaradar.

*Primary Examiner*—Gilberto Barrón, Jr.
*Attorney, Agent, or Firm*—Killworth, Gottman, Hagan & Schaeff

[57] ABSTRACT

A police radar signal detector detects and monitors radar signals from up to nine (9) radar sources until a detected radar signal has not been redetected for a given number of detector operations, or spectrum sweeps, or until a detected signal has been displaced by a higher priority radar signal. In the police radar signal detector of the present invention, a user of the detector is advised not only of the presence of detected radar signals, the frequency band of detected radar signals and the relative field strength of the signals but also of the number of different radar signal sources which are transmitting signals toward the user's motor vehicle. The information provided to the user for the frequency band of detected radar signals and the relative field strength of the signals is for the highest priority radar signal detected if more than one signal has been detected and is being monitored by the detector of the present invention. In addition, the directions of radar sources are determined and the user of the detector is advised of the direction or directions, front, side and rear, of origin of radar sources transmitting signals toward the user's motor vehicle. If sources are oriented at more than one direction relative to the user's motor vehicle, an indicator is illuminated to advise the user of all the directions of origin with the indicator for the direction of origin of the highest priority signal being flashed to so advise the user of the detector. Further, since multiple radar signals can be detected, each time a new radar signal is detected, a distinctive memo alarm is activated to alert the user to the presence of a new radar signal source.

6 Claims, 4 Drawing Sheets

| ANGLE θ | ΔP (dB) |
|---|---|
| 0° | 30.2 |
| 10° | 29.6 |
| 20° | 28.0 |
| 30° | 25.7 |
| 40° | 23.1 |
| 50° | 20.1 |
| 60° | 16.4 |
| 70° | 10.5 |
| 80° | 6.6 |
| 90° | −4.5 |
| 100° | −15.7 |
| 110° | −19.7 |
| 120° | −20.0 |
| 130° | −22.1 |
| 140° | −24.8 |
| 150° | −26.5 |
| 160° | −27.6 |
| 170° | −28.1 |
| 180° | −28.1 |

FRONT
TH1
SIDE
TH2
REAR

MOTOR VEHICLE POLICE RADAR DETECTOR FOR DETECTING MULTIPLE RADAR SOURCES

This is a continuation of application Ser. No. 07/982,594 filed Nov. 27, 1992 now U.S. Pat. No. 5,250,951, which is a division of application Ser. No. 07/891,715 filed Jun. 1, 1992, now U.S. Pat. No. 5,206,651 issued Apr. 27, 1993, which is a division of application Ser. No. 07/687,282 filed Apr. 18, 1991, now U.S. Pat. No. 5,146,226 issued Sep. 8, 1992.

CROSS REFERENCE TO RELATED APPLICATION

The present application is related to U.S. Pat. application Ser. No. 659,625 filed Feb. 25, 1991 and entitled Police Radar Detector for Detecting Radar Signals and Determining the Directional Origin of the Signal Source.

BACKGROUND OF THE INVENTION

The present invention relates generally to police radar detectors used in motor vehicles and, more particularly, to a police radar detector which not only detects radar signals incident on a motor vehicle but also determines if detected radar signals are coming from more than one radar signal source and alerts the operator of the motor vehicle of both the radar signals and that one or more sources of radar signals are present.

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals and the relative field strength of detected signals.

Widely varying operating procedures for using police radar and the proliferation of other signals assigned to the same frequency bands as police radar has led to the need for police radar detectors which give more information than that provided by currently available radar detectors. For example, two or more police speed monitoring radars may be deployed close to one another such that motorists become complacent after having passed the first unit only to encounter the second. Combinations of mobile and stationary units also may be used in an effort to mask one another and thereby defeat radar detectors.

In addition to the possible variations in police radar signal encounters, there are many different sources of microwave signals in the frequency bands allocated to police radar by the U.S. Federal Communications Commission (FCC) since these bands have also been allocated for transmitters performing other functions. For example, motion-detecting burglar alarms, automatic door openers, and low-power speed measuring devices used in sports also operate in the frequency bands allocated to police radar. Unfortunately, police radar detectors cannot distinguish between signals generated by a police radar transmitter and those generated by other devices which utilize microwave signals within the same frequency bands.

In addition to producing annoying false alarms to the operators of motor vehicles utilizing radar detectors, motorists become accustomed to such radar detector activating signals in certain locations along commonly traveled streets and highways. Police radar units may be deployed by the side of the roadway at these locations since the police also are aware of the local activating signals and that the signals tend to mask their own speed monitoring radar units.

Accordingly, there is a need for an improved police radar detector which can assist the operator of a motor vehicle using the detector to accurately interpret signals generated by the detector to alert the operator of police radar signals incident on the motor vehicle.

SUMMARY OF THE INVENTION

This need is met by the police radar detector of the present invention which detects and monitors multiple radar sources. In the illustrated embodiment, up to nine (9) radar sources are monitored by the detector, which continues to monitor up to nine (9) detected radar signals until a detected signal has not been redetected for a given number of detector operations, or spectrum sweeps, or until a detected signal has been displaced by a higher priority radar signal. In the police radar detector of the present invention, a user of the detector is advised not only of the presence of detected radar signals, the frequency band of detected radar signals and the relative field strength of the signals but also of the number of different radar signal sources which are transmitting signals toward the user's motor vehicle. The information provided to the user for the frequency band of detected radar signals and the relative field strength of the signals is for the highest priority radar signal detected if more than one signal has been detected and is being monitored by the detector of the present invention.

In addition, the directions of radar sources are determined and the user of the detector is advised of the direction or directions of origin of radar sources transmitting signals toward the user's motor vehicle. In the illustrated embodiment, three source origin directions: front, side and rear, are determined and indicated to a user of the detector. If sources are oriented at more than one direction relative to the user's motor vehicle, an indicator is illuminated to advise the user of all the directions of origin with the indicator for the direction of origin of the highest priority signal being flashed to so advise the user of the detector.

Since multiple radar signals are detected, each time a new radar signal is detected, a distinctive memo alarm is activated to alert the user to the presence of a new radar signal source. Further, to reduce operator annoyance, each time the detector is muted, all radar signals which have been detected at that time are marked as muted and are sounded only at a reduced volume. The muted marking of a detected radar signal is removed only when the radar signal is not detected for a period of time. Thus, if a signal comes and goes due to terrain or otherwise, it remains muted unless it is unmarked and detected thereafter as a new radar signal. Such operation can be used even for detectors which do not alert an operator of multiple radar sources since it prevents reinstatement of full volume alerting signals for such signals.

In accordance with one aspect of the present invention, a motor vehicle police radar signal detector for alerting an operator of a motor vehicle to incoming radar signals from more than one radar signal source comprises receiver means for receiving incoming radar signals. Detector means are coupled to the receiver means for detecting the incoming radar signals. Signal processing means are coupled to the detector means for identifying detected radar signals, storing identification signals representative of detected radar signals, and determining the number of stored identification signals which correspond to incoming radar signals generated by different radar signal sources. Alarm means are provided and operated by the signal processing means for alerting an operator of a motor vehicle using the radar signal detector of the number of different radar signal sources which are transmitting radar signals toward the motor vehicle.

The alarm means may comprise a numeric display which displays the number of different incoming radar signals incident on the motor vehicle. The signal processing means identifies each detected radar signal by means of the value of a ramp signal which is used to control the detector means. The value of the ramp control signal upon detection of a radar signal is stored and, together with the frequency band of the detected radar signal, serves to uniquely identify each detected radar signal.

In one embodiment of the present invention, the detector means comprises an analog-to-digital converter which receives the ramp signal and generates a digital representation thereof for the signal processing means. The analog-to-digital converter defines the resolution of the frequency spectrum for each frequency band monitored by the motor vehicle police radar detector, the resolution being equal to $2^n$ where n equals the number of digital places of digital output signals of the analog-to-digital converter. In one embodiment of the present invention, n = 8 and the frequency spectrum resolution is equal to 256 frequency divisions for each frequency band monitored by the radar detector.

In accordance with another aspect of the present invention, a motor vehicle police radar signal detector for alerting an operator of a motor vehicle to incoming radar signals from a plurality of radar signal sources comprises receiver means for receiving incoming radar signals. Detector means are coupled to the receiver means for detecting the incoming radar signals. Signal processing means are coupled to the detector means for identifying each of the incoming radar signals detected, storing identification signals representative thereof, and determining the number of different stored identification signals. Alarm means are operated by the processor means for alerting an operator of a motor vehicle using the radar signal detector of the number of different stored identification signals.

The alarm means may comprise a single digit digital display whereby the plurality of radar signal sources is effectively limited to nine (9) radar signal sources. Detected radar signal sources exceeding nine (9) are deleted from storage in the signal processing means in accordance with defined priority levels, the lowest priority levels being deleted first. The priority levels from highest priority to lowest priority are from highest weighted signal strength to lowest weighted signal strength. Multiple radar signal sources having equally large weighted signal strengths are further prioritized from highest priority to lowest priority by frequency band from Ka, K, Ku to X. Multiple equally large weighted signals in the same frequency band are further prioritized from highest priority to lowest priority by direction of source from front, rear to side, respectively.

In accordance with yet another aspect of the present invention, a method of operating a motor vehicle police radar signal detector for alerting an operator of a motor vehicle to incoming radar signals from more than one radar signal source comprises the steps of: detecting incoming radar signals; identifying detected radar signals to generate identification signals; storing identification signals representative of detected radar signals; determining the number of stored identification signals which corresponds to incoming radar signals generated by different radar signal sources; and, alerting an operator of a motor vehicle using the radar signal detector that radar signals from more than one radar signal source are incident on the motor vehicle.

The step of alerting an operator of a motor vehicle using the radar signal detector that radar signals from more than one radar signal source are incident on the motor vehicle preferably comprises indicating the number of different radar signal sources which are directing radar signals toward the motor vehicle. The step of alerting an operator of a motor vehicle using the radar signal detector that radar signals from more than one radar signal source are incident on the motor vehicle may comprise: generating an audible tone representative of detected radar signals, the audible tone having an operator selected volume; switching the radar signal detector to a mute state in response to a mute signal such that the audible tone is reduced in volume; and, canceling the mute state only when no radar signals are being detected or monitored. Preferably, the volume of the mute tone is set by an operator to a volume equal to or greater than a minimum tone volume. To ensure operator recognition of the detection of new radar signals, the step of alerting an operator of a motor vehicle using the radar signal detector that radar signals from more than one radar signal source are incident on the motor vehicle preferably comprises generating a distinct memo alarm upon the detection of radar signals from a new radar signal source.

In addition to the previously noted radar signal characteristics, the method of operating a motor vehicle police radar signal detector for alerting an operator of a motor vehicle to incoming radar signals from more than one radar signal source preferably further comprises: determining the direction of each source of detected radar signals, the identification signals including the determined direction of each source of detected radar signals; and, alerting an operator of a motor vehicle using the radar signal detector of the direction of at least one source of detected radar signals.

The step of alerting an operator of a motor vehicle using the radar signal detector of the direction of at least one source of detected radar signals may comprise lighting a corresponding indicator light. When radar signal sources are detected as originating from more than one direction, the step of alerting an operator of a motor vehicle using the radar signal detector of the direction of origin of at least one source of radar signals may comprise: blinking a corresponding indicator light for the direction of a source of a detected radar signal having a highest priority; and, lighting a corresponding indicator light for each additional detected radar signal originating from a direction other than the direction of the highest priority source. Preferably, the indicated directions of origin of detected radar signals are front, side and rear of the motor vehicle.

In accordance with still another aspect of the present invention, a method of operating a motor vehicle police radar signal detector for alerting an operator of a motor vehicle to incoming radar signals comprises the steps of: detecting incoming radar signals; generating an audible tone representative of detected radar signals, the audible tone being sounded at a defined volume; switching the radar detector to a mute state in response to a mute signal such that the audible tone is reduced in volume to an operator set mute tone volume equal to or above a minimum tone level; and, canceling the mute state only when no radar signals are being detected.

Thus, it is an object of the present invention to provide an improved police radar signal detector which provides information in addition to that provided by conventional radar signal detectors to assist the operator of a motor vehicle in accurately interpreting signals generated by the detector; to provide an improved police radar signal detector which provides information in addition to that provided by conventional radar signal detectors to assist the operator of a motor vehicle in accurately interpreting alarms generated by the detector wherein multiple radar signals are monitored and indicated to a user of the detector; and, to provide an improved police radar signal detector which provides information in addition to that provided by conventional radar signal detectors to assist the operator of a motor vehicle in accurately interpreting alarms generated by the detector wherein multiple radar signals are monitored with the direction of the origin of those signals being determined, both the number and directions of origin of detected radar signals being indicated to a user of the detector.

Other objects and advantages of the invention will be apparent from the following description, the accompanying drawings and the appended claims.

DETAILED DESCRIPTION OF THE INVENTION

As previously noted, the present invention relates to a motor vehicle radar detector which not only detects the presence of radar signals incident on a motor vehicle but also determines whether the signals are coming from more than one radar signal source and alerts the operator of the motor vehicle of both the presence of radar signals and also the number of sources of radar signals being monitored by the detector.

Figure 1:
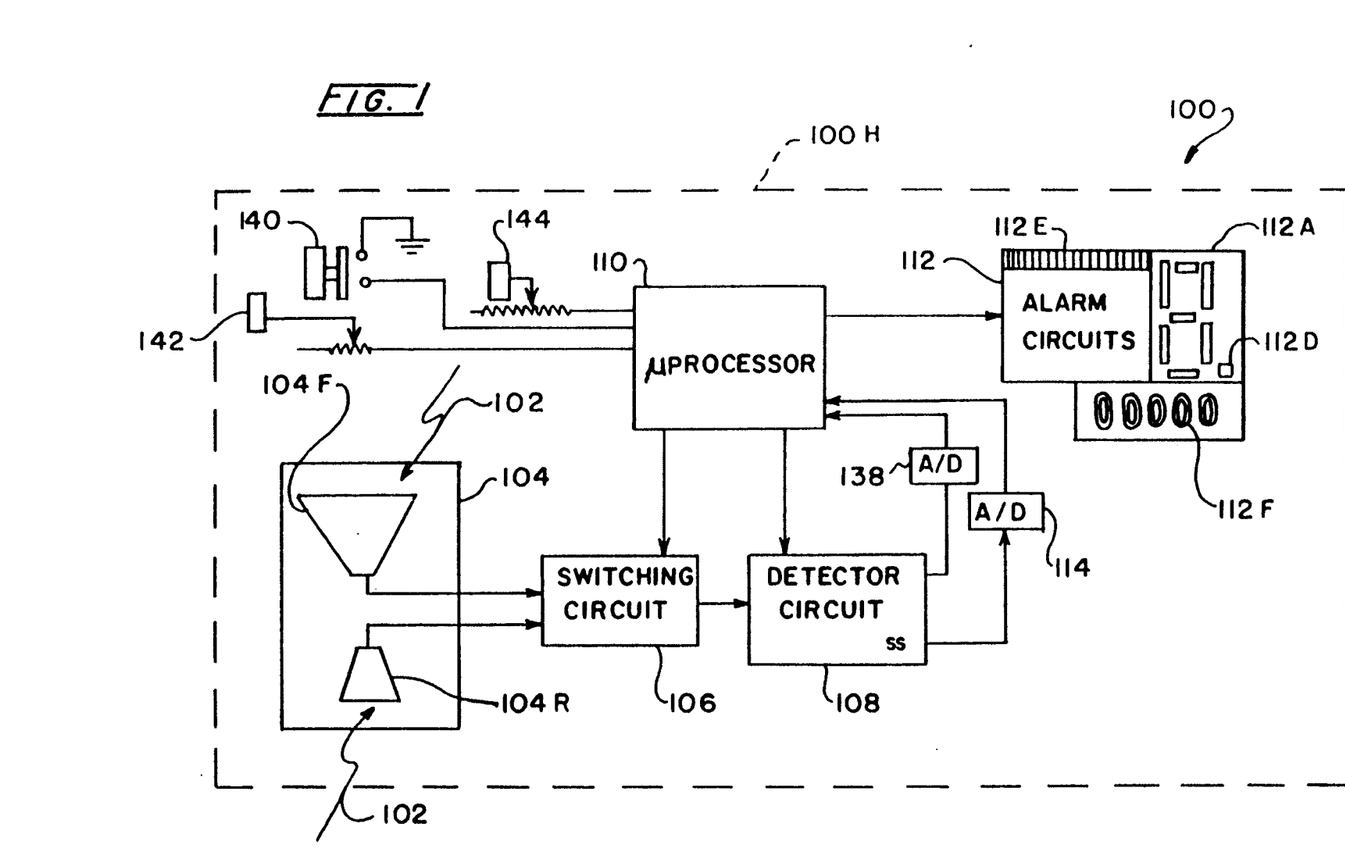
FIG. 1 is a schematic block diagram of a radar detector including the present invention.

The radar detector 100 of FIG. 1 monitors one or more police radar bands to sense radar signals 102 incident upon receiver means comprising antennas 104, a generally forwardly directed front antenna 104F and a generally rearwardly directed rear antenna 104R, of the detector 100. While the antennas 104F, 104R are illustrated as generally facing the front and the rear of a vehicle including the detector 100, it is to be understood that the antenna directions can be different for given applications and as a result of existing or future requirements. Signals received by the antennas 104F, 104R are passed to connector means comprising a switching circuit 106 in the illustrated embodiment for connecting signals from the antennas 104F, 104R to detector means which detects incoming signals and distinguishes radar signals from noise such that valid incoming radar signals can be indicated to the person using the detector 100.

In the embodiment illustrated in FIG. 1, the detector means comprises any appropriate radar detector circuit 108 capable of generating a signal strength (SS) output signal which indicates the strength of valid radar signals detected by the detector circuit 108. The switching circuit 106 and radar detector circuit 108 are not important to the invention of the present application, can take a wide variety of forms and can include amplifiers, mixers, diplexers, and other circuitry commonly used in the radar detector field as are well known to those skilled in the art. Accordingly, the switching circuit 106 and the radar detector 108 will not be further described herein.

Processor means taking the form of a microprocessor 110 in the illustrated embodiment control the switching circuit 106 to selectively connect signals from the antennas 104F and 104R to the detector circuit 108. While the detector circuit 108 may operate autonomously, operation and control of the detector circuit 108, for example for the detection of radar signals in different frequency bands allocated to police radar signals, is also performed by the microprocessor 110 in the illustrated embodiment. The microprocessor 110 additionally controls alarm circuits 112 to communicate information regarding detected radar signals to the operator of a motor vehicle using the radar detector 100 by means of one or more alarm tones and/or visual indicators which are included within the alarm circuits 112 and will be further described hereinafter. As shown in FIG. 1, the antennas 104F and 104R are preferably positioned within a single housing which can be the radar detector housing 100H, schematically represented by the dotted line box of FIG. 1.

Figure 2:
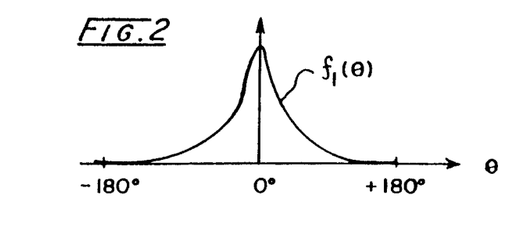
FIG. 2 is a graph of an antenna pattern function $f_1(\Theta)$ for one frequency band of a forwardly directed front antenna of FIG. 1.
Figure 3:
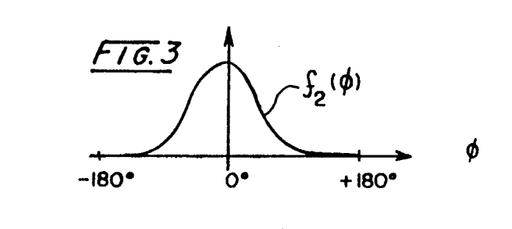
FIG. 3 is a graph of an antenna pattern function $f_2(\phi)$ for one frequency band of a rearwardly directed rear antenna of FIG. 1.
Figure 4:
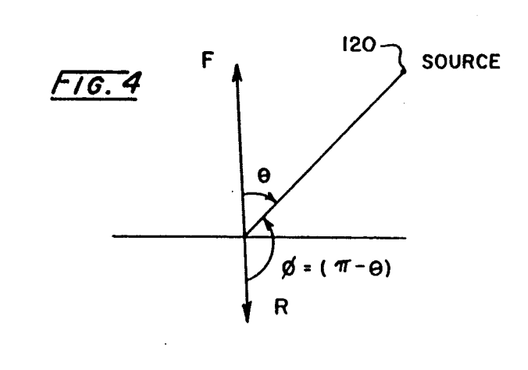
FIG. 4 is a graph of a radar source oriented at an angle $\Theta$ relative to the forward direction of a vehicle and at an angle $\phi$, $(\pi - \Theta)$, relative to the rear direction of the vehicle.

The determination of the direction of the source of radar signals incident on a motor vehicle in the radar detector 100 will now be described with reference to FIGS. 2-8. FIG. 2 is a graphic representation of an antenna pattern function $f_1(\Theta)$ for one frequency band received by the forwardly directed antenna 104F where $\Theta$ represents the incident angle relative to the forward direction F of the motor vehicle utilizing the radar detector 100. Similarly, FIG. 3 is a graphic representation of an antenna pattern function $f_2(\phi)$ for the same frequency band of the rearwardly directed antenna 104R where $\phi$ represents the incident angle relative to the rear direction R of the motor vehicle utilizing the radar detector 100 with $\phi$ equalling $(\pi-\Theta)$. Thus, as shown in FIG. 4, a radar source 120 is oriented at an angle $\Theta$ relative to the forward direction F of the vehicle and at an angle $\phi$, $(\pi-\Theta)$, relative to the rear direction R of the vehicle.

Figure 5:
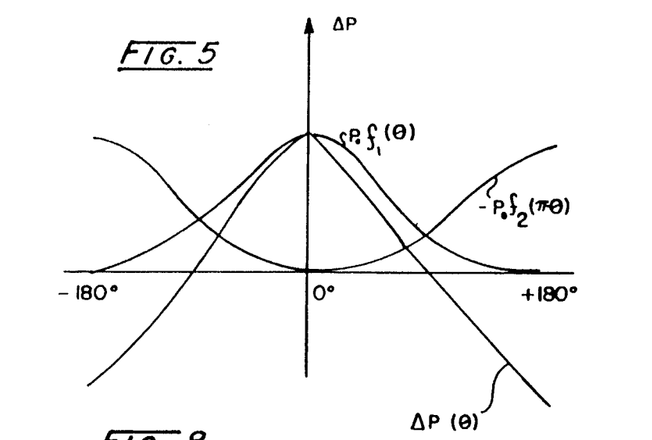
FIG. 5 is a graphic overlay of the functions $\Delta P(\Theta)$, $P_0 f_1(\Theta)$ and $P_0 f_2(\pi-\Theta)$ illustrating the difference between the weighted powers of the signals received by the front and rear antennas of FIG. 1.

FIG. 5 is a graphic overlay representing the functions $\Delta P(\Theta)$, $P_0f_1(\Theta)$ and $P_0f_2(\pi-\Theta)$ wherein $\Delta P(\Theta)$ is the difference between the weighted power of the signal received in the forwardly directed antenna 104F, $P_0f_1(\Theta)$, and the power of the signal received in the rearwardly directed antenna 104R, $P_0f_2(\pi-\Theta)$, thus:

$$\Delta P(\Theta) = P_0f_1(\Theta) - P_0f_2(\pi-\Theta).$$

Figure 6:
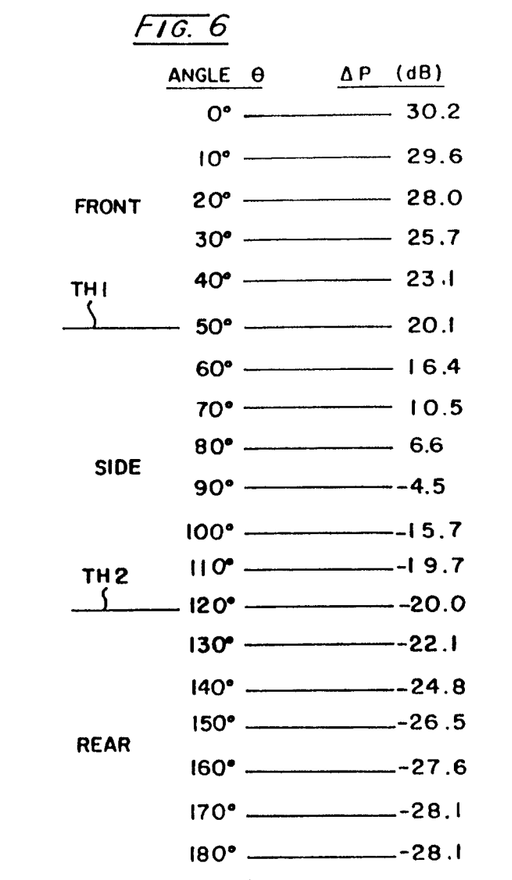
FIG. 6 is an empirically determined table for determining the angular orientation of a radar source relative to a vehicle utilizing the radar detector of FIG. 1.

As can be seen from FIG. 5, $\Delta P(\Theta)$ is symmetric with respect to $\pm\Theta$ and is monotonic for $0 \leq \Theta \leq \pi$. In practice, a table is prepared for each frequency band to be monitored, for example as shown in FIG. 6 wherein $\Delta P(\Theta)$, listed in decibels (dB), has been determined for every 10° of the source angle $\Theta$. Once the specific forwardly directed antenna 104F and the rearwardly directed antenna 104R have been selected for use in the detector 100, the table of FIG. 6 is prepared empirically. A unit fixed power source operating at the frequency of interest is physically positioned at the corresponding angular positions and the power received by the antennas 104F and 104R is recorded. A different table is used for each frequency band since the antenna patterns are quite different for the different frequency bands which are allocated for police radar. If multiple bands are monitored, as is typically the case, weighting of the signals received in the different bands may be performed to approximately equalize the effective signal levels for corresponding power level sources in the different frequency bands. Such weighting is inherent in the tables which are empirically generated as described for a given pair of antennas 104F, 104R.

The directional aspects of the operation of the radar detector 100 will now be described with reference to the flow chart of FIG. 7. While the detector circuit 108 can be used to monitor or sweep only one or any reasonable number of frequency bands (three frequency bands are commonly swept in state-of-the-art police radar detectors), it will be described as monitoring or sweeping at least two frequency bands, one frequency band in a lower range of frequencies allocated to police radar detectors (LO BAND) and one frequency band in an upper range of frequencies allocated to police radar detectors (HI BAND). The microprocessor 110 initially selects the antenna 104F or 104R the signals from which are to be connected first to the radar detector circuit 108 and used for the current sweep, see block 200. The forwardly directed antenna 104F is selected more often than the rearwardly directed antenna 104R due to the greater threat in front of a vehicle and the relatively faster closing speeds. In any event, after one of the antennas 104F or 104R is selected, the low band is swept in a conventional manner, see block 202.

If any valid radar signals are detected, see block 204, the strength of the signals is recorded by the microprocessor 110, see block 206. In the radar detector 100, output signals from an analog to digital (A/D) converter 114, which are connected to the microprocessor 110, are utilized as signal strength signals since the digital signals are easily processed and stored by the microprocessor 110. The frequencies of detected signals are maintained in the present invention for signal direction processing by the microprocessor 110, the detector circuit 108 stopping upon initial signal detection to permit storage of identification signals.

As soon as a valid radar signal has been detected and the detector circuit 108 stopped, the selection of the antennas 104 is switched and the same signal is detected for the other antenna, see block 208. The signal strength of the signal in the other antenna is recorded, see block 210. At this point, a valid radar signal will have been detected, and the strength of the signal in both antennas 104F and 104R will have been determined and recorded by the microprocessor 110. The microprocessor 110 next determines the angular direction of the source 120 relative to the motor vehicle which contains the radar detector 100, see block 212.

The determination of the direction of the detected radar source can be performed by table look-up using the appropriate table for the band including the detected radar signal and the signal strengths of the signal in the antennas 104F and 104R. While it would be possible to precisely identify the angular direction of the radar source 120, for the motor vehicle radar detector 100 of the present invention, identification of one of three directions appears to be adequate for the operator of a motor vehicle including the detector 100: front, side or rear.

Thus, as shown in FIG. 6, it is possible to select upper and lower thresholds TH1 and TH2 with the direction of the radar source 120 being identified as: from the front if the power difference $\Delta P(\Theta)$ exceeds the upper threshold TH1; from the rear if the power difference $\Delta P(\Theta)$ is below the lower threshold TH2; and, from the side if the power difference $\Delta P(\Theta)$ is equal to or between the upper threshold TH1 and the lower threshold TH2. As shown in FIG. 6, the thresholds TH1 and TH2 correspond approximately to $+20$ db and $-20$ db, respectively which corresponds to approximately 0°–50° front, approximately 50°–120° side, and approximately 120°–180° rear. Of course the precise selections of the designations of front, side and rear depend upon user comfort and will ultimately be determined during field testing of the detector 100. The actual designations of front, side and rear can be programmed into the microprocessor 110 and may even be made selectable if deemed desirable from a user's standpoint.

The alarms are next updated based on the preceding determinations, see block 214. In addition to an audible indication of a detected radar signal, a visual indication will be given to the operator which visual indication will indicate the identified direction of the radar source 120. For example, as shown in FIG. 8 a three element visual display 130 is provided. For a radar source identified as being in front of the vehicle, an upward or forwardly directed arrow indicator 132 is lighted; for a radar source identified as being to the side of the vehicle, a double-ended, sidewardly directed arrow indicator 134 is lighted; and, for a radar source identified as being to the rear of the vehicle, a downwardly or rearwardly directed arrow indicator 136 is lighted.

The antennas 104 are then switched again to restore the radar detector to receive signals from the antenna from which it was receiving signals when a valid radar signal was detected, see block 216. If the low band was being swept and was not completely swept, the sweep of the low band continues from where the sweep was interrupted, see block 218. If the low band was completely swept or the high band was being swept, the sweep of the high band commences or is continued from where it was interrupted, see block 220. Any radar signals which are detected during the sweep of the high band are handled in the manner just described for the low band. After the low band and high band have been swept, the microprocessor 110 is returned to the point where it once again selects the antenna to be used for the next sweeping operation, see blocks 222 and 200, respectively.

It is noted that the radar detector 100 of the present invention can be used to monitor or sweep a single frequency band, two frequency bands or any reasonable number of frequency bands which have been allocated to police radar. Accordingly, the disclosure of the present invention in terms of sweeping a low band and a high band is not to be interpreted as limiting the present invention to sweeping only two frequency bands.

The determination of the number of radar sources which are directing radar signals toward a motor vehicle using the radar detector 100 in accordance with the present invention will now be described. To keep track of multiple potential threats, the microprocessor 110 maintains an alarm table 300, see FIG. 9, for long term processing of up to nine (9) detected radar signals. Information regarding each detected signal is logged into the alarm table 300 on each spectrum scan.

Figure 9:
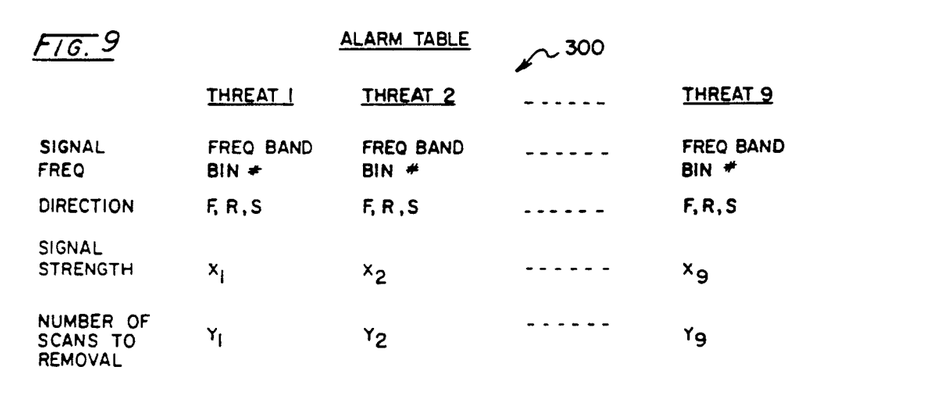
FIG. 9 is a schematic representation of an alarm table used for long term processing of up to nine (9) radar signals in accordance with the radar detector of the present invention.

For a new signal, i.e. a detected radar signal which has not been previously detected and is not currently logged in the alarm table 300, data representing the following information is entered into the alarm table 300: signal frequency; signal source direction; signal strength; and, the number of spectrum scans until the signal is to be removed from the alarm table 300 if the signal is not redetected.

For a previously detected signal which has already been entered in the alarm table 300, information about the signal which has changed is updated. At the end of each spectrum scan, the alarm table 300 is processed to determine alarm information. The alarms will be fully described hereinafter; however, it is noted that the number of signals detected on a given spectrum scan is used as the number of potential threat signals and is displayed on a digital display 112A of the alarm circuits 112.

While the detection of nine (9) or more detected radar signals will not often occur, whenever more than nine (9) signals are detected, signals in excess of nine (9) will have to be discarded and ignored by the radar detector 100. The following priorities are established for maintaining the table 300 with the most threatening nine (9) detected radar signals. The radar signals with the lowest weighted signal strengths are considered to be the lowest priority and are discarded if more than nine (9) radar signals are detected. Signals with equally weighted signal strengths are discarded in the following order: first discard X band signals; next discard Ku band signals; next discard K band signals; and, finally discard Ka band signals. Signals with the same weighted signal strengths and in the same band are discarded based on the direction of origin of their sources as follows: first discard signals coming from the side of the detector 100 or vehicle utilizing the detector; next discard signals coming from the rear of the detector 100; and, finally discard signals coming from the front of the detector 100.

The frequencies of detected radar signals are identified in the radar detector 100 by sweep signals generated by the microprocessor 110 or by the detector circuit 108 in combination with the band identifications for detected radar signals. Sweep signals generated by the microprocessor 110 can be used directly while sweep signals generated by the detector circuit 108 are converted to digital signals by an analog to digital (A/D) converter 138. The use of the sweep signals to identify the frequencies of detected signals is apparent from an understanding of how a typical radar detector operates. Detection is performed by varying the frequency of a local oscillator over a frequency range which is sufficient to ensure that the resulting intermediate frequency generated by mixing with a radar signal of interest passes through limited bandwidth circuitry within the detector. The sweep is performed by a ramp signal which is typically repeated. See for example U.S. Pat. No. 4,313,216 which is incorporated herein by reference.

If the sweep is performed by the microprocessor 110, the value of the ramp signal can be stored by the microprocessor upon detection of the radar signal as the bin # of the signal with the frequency band also being noted for complete identification. The value of the ramp signal is directly available if digital signals are converted to an analog signal for sweeping the detector. Alternatively, if an analog signal is directly generated, for example by circuitry internal to the radar detector, the value of the ramp signal is first converted to a digital signal, for example by the A/D converter 138, and then used by the microprocessor 110. The value of the sweep signal at the time of detection of a radar signal can be temporarily retained until stored in the alarm table 300 by the microprocessor 110 or the sweep signal may be halted pending storage and possibly verification of the radar signal as a valid signal as opposed to noise received by the detector 100.

In any event, the value of the sweep signal from the microprocessor 110 or the A/D converter 138 define frequency bins such that the frequency band and bin # are entered into the table 300 for each detected radar signal. In a working embodiment of the present invention, the A/D converter 138 generates 8 bit digital output signals such that $2^n$ or 256 frequency bins are defined for each frequency band of the radar detector 100. This resolution defines bins of less than 1 Mhz for the low frequency bands and bins of around 4 Mhz for the high frequency bands. While these bin sizes appear to be adequate for operation of the present invention, smaller bin sizes can be provided by selecting the A/D converter 138 to have more than 8 bit digital output signals.

The angular orientations or directions of the radar sources from a motor vehicle utilizing the radar detector 100 are determined as described above and the direction: front, F; rear, R; or, side, S, of the source of each detected radar signal which is being tracked by the radar detector 100 is recorded.

The raw signal strength values for each antenna 104F and 104R are then processed by a fast attack/slow decay filter algorithm performed by the microprocessor 110. The signal strength data is then multiplied by a band determined weighting factor to give an estimate of relative threat potential. When the signal strength listed in the table 300 is less than the current value, it is overwritten with the current value. When the current signal strength is less than the value listed in the table 300, then the value in the alarm table is replaced by the previous alarm table 300 value minus some fractional portion of the difference between the alarm table value and the signal strength for this scan. In a working embodiment the fraction is set to ¼; however, this value is subject to adjustment based on field testing of the detector.

In a working embodiment of the present invention, the weighting factors for the frequency bands are as follows: X =1.0; Ku =1.75; K =1.75; and, Ka =2.5. While these are the currently preferred weighting factors, other weighting factors may prove to be better in accordance with user requirements. Such weighting factors will ultimately be determined by tests of the radar detector 100. Since the decay fraction and weighting factors are programmed into the microprocessor 110, they can be readily adjusted and easily changed as a result of such testing.

A motor vehicle operator using the radar detector 100 of the present invention is advised of the radar signals which are being detected and monitored by the detector by means of both audible and visual means. As previously noted, the number of potential threat signals is displayed on the digital display 112A of the alarm circuits 112. The operator is also visually alerted of the direction of the radar source relative to the operator's vehicle by the three element visual display 130 which also forms part of the alarm circuits 112. In addition, the operator is visually alerted of the frequency band of the highest priority signal by means of the decimal point 112D of the digital display 112A. In particular: the decimal point 112D is lighted if a Ku band signal is the highest priority signal; the decimal point 112D is flashed if a Ka band signal is the highest priority signal; and, the decimal point 112D is not lighted if an X or K band signal is the highest priority signal. Finally, weighted signal strength of the highest priority signal is displayed on a bargraph display 112E and is used to control an on/off gating rate for an audible signal as will be described.

If detected radar signals are incident on the vehicle from more than one direction, the direction indicators for all those directions are lighted and the directional indicator, 132, 134 or 136, of the signal of the highest priority signal is flashed to highlight its priority. Signal priorities are the same as noted above relative to the discarding of signals detected in excess of nine (9). Stated in appropriate order for determining the priority of signal threats: the signal with the highest weighted signal strength is taken to be the highest priority; if multiple, equally large weighted signals are detected, the ranking from highest to lowest priority is Ka, K, Ku and then X; if multiple, equally weighted signals are detected in the same band, the ranking from highest to lowest priority is front, rear and then side. The frequency ranges of the four police radar bands referred to are generally recognized as the following: the X band (10.475–10.575 Ghz); the Ku band (13.400–13.500 Ghz); the K band (24.025–24.275 Ghz); and, the Ka band (34.150–35.250 Ghz).

In addition to the visual displays, the alarm circuits 112 of the radar detector 100 include an audio transducer 112F which is controlled by the microprocessor 110 to audibly indicate the presence of possible threat signals. During the presence of one or more detected radar signals, i.e. an alarm condition, an audible alarm tone is emitted by the audio transducer 112F to indicate the band and relative signal strength of the highest priority signal. A "beep" tone is sounded to indicate an X band signal and a raspy "brap" tone is sounded to indicate a K, Ka or Ku band signal. The strength of the highest priority signal is indicated by on/off gating of the alarm tone. The alarm tone is a repetitive sequence of tone bursts of approximately 70 milliseconds (msec) for each tone burst followed by an interval of silence inversely proportional to the strength of the signal. When signal strength is at or above an upper threshold, the alarm tone will remain on continuously. When signal strength is at or below a lower threshold, the alarm tone will be a 70 msec burst of tone, either beep or brap according to frequency band, followed by a period of silence of approximately 4 seconds.

To reduce the annoyance of extended sounding of the alarm tone, the operator of the motor vehicle can operate a momentary make mute switch 140 which switches the radar detector 100 to a mute state to thereby reduce the alarm tone from an initial alarm volume level determined by an operator controlled main alarm volume control 142 to a muted alarm volume level which is reduced relative to the unmuted alarm volume level. Preferably, the volume of the muted alarm tone is determined by a muted output volume control 144. The muted output volume control 144 permits the operator to select a percentage of the unmuted volume level as the volume level of the muted alarm tone with the minimum muted alarm tone volume level being a factory preset level beneath which the signal level cannot be reduced. Thus, when a signal is first detected, the appropriate alarm signal is emitted at an initial selectable volume level which can then be muted by the operator of the vehicle. Once the detector 100 has entered the mute state, the mute state remains until no radar signals are being detected or monitored or the radar detector 100 is turned off and back on.

Radar detectors are often provided with two or more operating modes, for example highway mode for operation outside of metropolitan areas and city mode for operation within metropolitan areas. Such modes permit the radar detector to utilize different signal sensitivities dependent upon the mode selected by the operator. In the present invention, if a city mode is provided and enabled, X band signals below a predetermined "auto-mute" threshold are only sounded at the muted level. This alerting feature reduces the annoyance created by repeated full volume alarms generated by detection of X band signals, which are ubiquitous in metropolitan areas, yet still alerts an operator of a strong X band signal.

To be sure that the operator of the motor vehicle is aware of multiple radar signals, a memo alarm is activated to indicate when each new signal is detected. The memo alarm may be visual, such as a steady or flashing light referred to as a memo light herein, or preferably a distinctive audible tone referred to as a memo tone herein, or a combination of the two. After the memo alarm has been activated, the radar detector 100 reverts to the standard band identification/signal strength alerting procedures just described. To prevent weak radar signals or momentarily blocked radar signals from initiating a potentially annoying memo light and/or memo tone as the signals come and go, the radar detector 100 keeps track of alarm signals for a period of time after the signal is not detected in a spectrum scan. Initiation of a memo alarm is inhibited for these signals when they reappear within the designated time period and, if previously marked as being muted, the muted state will be retained.

In a working embodiment of the detector, the time period is currently set for approximately 5 seconds by setting the number of scans until removal from the alarm table 300 at 40 scans. Each time a signal reappears within this time period, the number of scans to removal is reset to 40 scans to ensure that a full time period has elapsed before the signal is removed from the table 300. While no memo alarm is generated for signal reappearance, the reappearance will be counted in the number of signals detected during the spectrum scan and, if the signal is the highest priority signal, it will control the type of tone and the signal strength audibly and visually displayed to the operator of the vehicle. If a radar signal being monitored is the only signal presently being detected or monitored, upon disappearance of the signal, the signal alerting tones and lights are stopped. Upon reappearance, the appropriate radar signal alerting tones and lights are once again restarted; however, no memo alarm is activated since the radar signal is not a new signal. Further, if one or more signals being monitored have previously been muted by the operator, upon reappearance, the signal or signals which were previously marked as being muted will remain in the muted state and be sounded accordingly.

Figure 7:
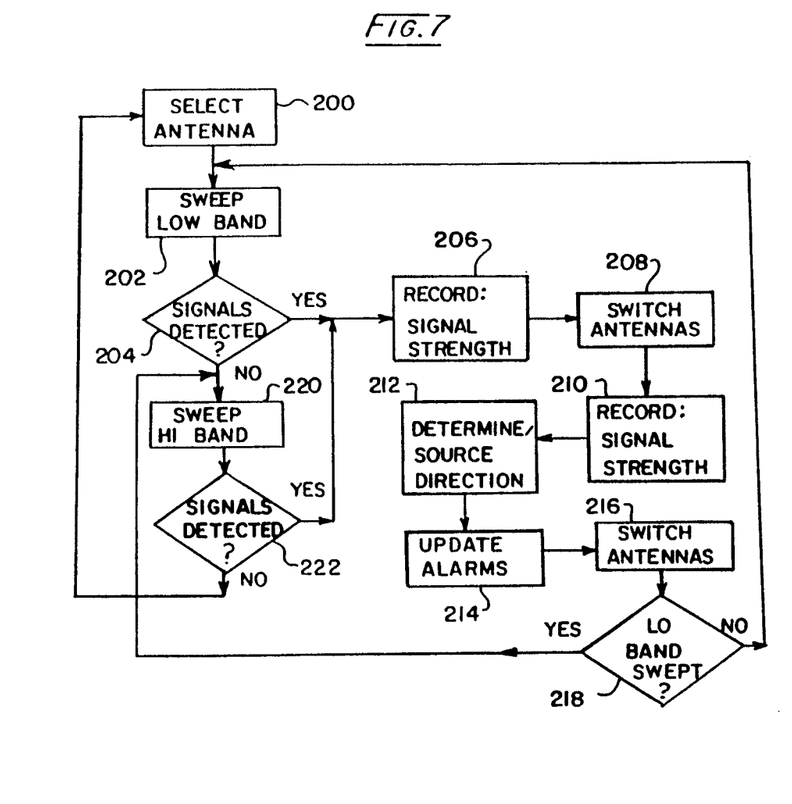
FIG. 7 is a flow chart of the operations of the radar detector of FIG. 1 for determining the angular orientation of a radar source relative to a vehicle utilizing the radar detector of FIG. 1.
Figure 8:
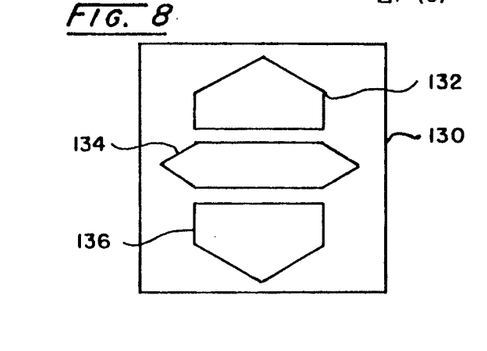
FIG. 8 is an elevational view of a three directional display for use in the radar detector of FIG. 1.
Figure 10:
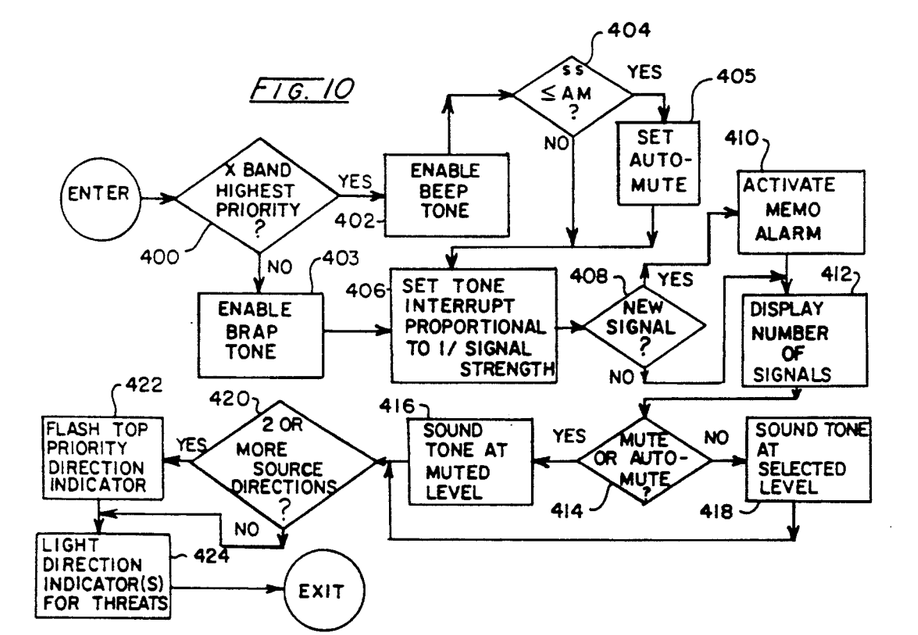
FIG. 10 is a flow chart of the operations of the radar detector of FIG. 1 for threat display determinations.

Operation of the radar detector 100 of FIG. 1 for threat display determinations will now be summarized with reference to FIG. 10 which sets forth steps for performing the alarm update function of block 214 of FIG. 7. The highest priority detected radar signal is determined, see block 400. If the highest priority detected radar signal is in the X band, the beep tone is enabled otherwise, the brap tone is enabled, see blocks 402, 403. If the radar detector 100 includes a city mode, the city mode is selected by the operator, i.e. enabled, and the signal strength of an X band signal is below the automute threshold, automute is set, see blocks 404, 405. Next, the tone interrupt time is set to between zero (0) seconds and four (4) seconds with the time set being inversely proportional to the signal strength of the highest priority detected radar signal, see block 406.

The detected radar signal is next examined to determine whether it is a new signal or a previously detected signal, see block 408. If the detected radar signal is a new signal, a distinctive memo alarm is activated to alert the operator of the new signal, see block 410. The number of detected signals is displayed on the digital display 112A such that the operator can determine the number of such sources, see block 412. If the detected radar signal is not a new signal, the memo alarm is not activated but the number of detected signals is still displayed, see block 412. The detector next determines whether the mute switch 140 has been operated or automute has been set (city mode only), see block 414. If previously muted or only automute signals are present (city mode only), the appropriate tone is sounded with the appropriate interruption rate and at the selected muted volume level, see block 416; if not previously muted or if all signals are not automute signals (city mode only), the appropriate tone is sounded with the appropriate interruption rate and at the selected alarm volume level, see block 418.

Next, the display of the direction of the radar source or sources is determined. The detector 100 determines whether there are sources coming from two or more directions, see block 420. If so, the direction indicator for the highest priority signal is flashed, see block 422. If only one radar source direction has been identified, that direction is lighted and if two or more radar source directions have been identified, the radar source directions of the detected lower priority radar signals are lighted continuously, see block 424.

Having thus described the police radar detector identifying multiple radar signal sources of the present invention in detail and by reference to preferred embodiments thereof, it will be apparent that modifications and variations are possible without departing from the scope of the invention defined in the appended claims.

What is claimed is:

1. A method of operating a motor vehicle police radar signal detector for alerting an operator of a motor vehicle to incoming radar signals from more than one radar signal source, said method comprising the steps of:

detecting an incoming first radar signal;
   identifying said detected first radar signal;
   alerting an operator of a motor vehicle using said radar signal detector that said identified first radar signal is incident on the motor vehicle;
   detecting an incoming second radar signal while said first radar signal is still incident on the motor vehicle;
   identifying said detected second radar signal; and
   alerting said operator that said second radar signal is incident on the motor vehicle.

2. A method of operating a motor vehicle police radar signal detector for alerting an operator of a motor vehicle to incoming radar signals from more than one radar signal source, said method comprising the steps of:

detecting an incoming first radar signal;
   identifying said detected first radar signal;
   generating an audible tone to alert an operator of a motor vehicle using said radar signal detector that said identified first radar signal is incident on the motor vehicle, said audible tone being sounded at a defined volume;
   reducing the volume of said audible tone in response to a mute signal;
   detecting an incoming second radar signal while said first radar signal is still incident on the motor vehicle;
   identifying said detected second radar signal; and
   generating an audible tone at said defined volume to alert said operator that said second radar signal is incident on the motor vehicle.

3. A method of operating a motor vehicle police radar signal detector for alerting an operator of a motor vehicle to incoming radar signals, said method comprising the steps of:

detecting an incoming radar signal;
   alerting an operator of a motor vehicle using said radar signal detector of said detected radar signal;
   detecting another incoming radar signal while still detecting said incoming radar signal; and
   informing said operator of said another incoming radar signal.

4. A method of operating a motor vehicle police radar signal detector for alerting an operator of a motor vehicle to incoming radar signals, said method comprising the steps of:

detecting incoming radar signals;
   identifying detected radar signals to generate identification signals;
   storing identification signals representative of detected radar signals;

maintaining stored identification signals until corresponding radar signals have not been detected for a period of time;

comparing identification signals for each detected radar signal to stored identification signals to determine whether each detected radar signal is a newly detected radar signal or a previously detected radar signal; and alerting an operator of a motor vehicle using said radar signal detector that a newly detected radar signal is incident on the motor vehicle.

5. A method of operating a motor vehicle police radar signal detector for alerting an operator of a motor vehicle to incoming radar signals from more than one radar signal source, said method comprising the steps of:

detecting incoming radar signals;

identifying detected radar signals to generate identification signals;

storing identification signals representative of detected radar signals;

processing said stored identification signals to determine whether said stored identification signals include a newly detected and identified incoming radar signal; and alerting an operator of a motor vehicle using said radar signal detector of any newly detected and identified radar signals incident on the motor vehicle.

6. A method of operating a motor vehicle police radar signal detector for alerting an operator of a motor vehicle to incoming radar signals from more than one radar signal source as claimed in claim 5 wherein the step of processing said stored identification signals comprises the step of comparing each identification signal to previously stored identification signals.

* * * * *